United States Patent
Aronowitz et al.

(10) Patent No.: US 11,211,053 B2
(45) Date of Patent: Dec. 28, 2021

(54) SYSTEMS AND METHODS FOR AUTOMATED GENERATION OF SUBTITLES

(71) Applicant: International Business Machines Corporation, Armonk, NY (US)

(72) Inventors: Hagai Aronowitz, Modlin (IL); Zvi Kons, Yoqneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 16/420,207

(22) Filed: May 23, 2019

(65) Prior Publication Data

US 2020/0372899 A1 Nov. 26, 2020

(51) Int. Cl.
*G10L 15/07* (2013.01)
*H04N 19/186* (2014.01)
*G10L 15/26* (2006.01)

(52) U.S. Cl.
CPC .............. *G10L 15/07* (2013.01); *G10L 15/26* (2013.01); *H04N 19/186* (2014.11)

(58) Field of Classification Search
None
See application file for complete search history.

(56) References Cited

U.S. PATENT DOCUMENTS

| | | | |
|---|---|---|---|
| 2007/0071206 A1* | 3/2007 | Gainsboro | G10L 25/63 379/168 |
| 2008/0221876 A1* | 9/2008 | Holdrich | G11B 20/00007 704/201 |
| 2011/0320197 A1* | 12/2011 | Conejero | G06F 16/685 704/235 |
| 2013/0029377 A1 | 1/2013 | Caparon et al. | |
| 2013/0293777 A1 | 11/2013 | Huber et al. | |
| 2016/0179831 A1* | 6/2016 | Gruber | G06F 40/42 704/235 |
| 2017/0132821 A1 | 5/2017 | Valliani et al. | |
| 2018/0005037 A1* | 1/2018 | Smith, IV | G10L 15/26 |
| 2018/0075860 A1* | 3/2018 | Parada | G10L 21/028 |
| 2018/0286409 A1* | 10/2018 | Baughman | G10L 17/06 |

(Continued)

FOREIGN PATENT DOCUMENTS

| | | |
|---|---|---|
| CN | 104392633 | 3/2015 |
| JP | 2015041885 | 3/2015 |

OTHER PUBLICATIONS

Speaker Embedding Extraction with Phonetic Information by Liu et al., Jun. 2018.*

*Primary Examiner* — Neeraj Sharma
(74) *Attorney, Agent, or Firm* — G. E. Ehrlich (57) ABSTRACT

There is provided a computer implemented method of presenting color coded text generated from an audio track of a video, the color coding denoting respective speakers, comprising: receiving the audio track of the video divided into a plurality of audio-segments each representing speech spoken by a respective speaker of a plurality of speakers, for each audio-segment of the plurality of audio-segments: receiving a text representation of the audio-segment, extracting a feature vector from the audio-segment, mapping the feature vector to a color space, coloring the text representation according to the color space, and presenting the colored text representation in association with a video-segment corresponding to the audio-segment.

18 Claims, 3 Drawing Sheets

(56) References Cited

U.S. PATENT DOCUMENTS

| | | | |
|---|---|---|---|
| 2019/0341052 A1* | 11/2019 | Allibhai | G10L 15/22 |
| 2020/0051582 A1* | 2/2020 | Gilson | H04N 21/4307 |
| 2020/0066281 A1* | 2/2020 | Grancharov | G10L 17/04 |
| 2020/0135204 A1* | 4/2020 | Robichaud | G10L 17/06 |
| 2020/0227068 A1* | 7/2020 | Huang | G06K 9/522 |
| 2021/0168460 A1* | 6/2021 | Lee | H04N 21/4884 |

* cited by examiner

SYSTEMS AND METHODS FOR AUTOMATED GENERATION OF SUBTITLES

BACKGROUND

The present invention, in some embodiments thereof, relates to sub-titles and, more specifically, but not exclusively, to systems and methods for automated linking of sub-titles to speakers.

Subtitles are captions presented on the bottom of a video, which are a transcription of what the speakers are saying. Subtitles are useful for hearing impaired people, which are unable to properly hear and/or understand the audio portion of the video. Rather than listening to the audio portion, the hearing-impaired person reads the transcription of what the character in the video is saying.

When a speaker or a speaker's face are not shown on the screen it might be hard for a hearing-impaired person to understand who is speaking. Therefore, there is a need for some annotation of the subtitle's text that links it with the speaker.

SUMMARY

According to a first aspect, a computer implemented method of presenting color coded text generated from an audio track of a video, the color coding denoting respective speakers, comprises: receiving the audio track of the video divided into a plurality of audio-segments each representing speech spoken by a respective speaker of a plurality of speakers, for each audio-segment of the plurality of audio-segments: receiving a text representation of the audio-segment, extracting a feature vector from the audio-segment, mapping the feature vector to a color space, coloring the text representation according to the color space, and presenting the colored text representation in association with a video-segment corresponding to the audio-segment.

According to a second aspect, a system for presenting color coded text generated from an audio track of a video, the color coding denoting respective speakers, comprises: at least one hardware processor executing a code for: receiving the audio track of the video divided into a plurality of audio-segments each representing speech spoken by a respective speaker of a plurality of speakers, for each audio-segment of the plurality of audio-segments: receiving a text representation of the audio-segment, extracting a feature vector from the audio-segment, mapping the feature vector to a color space, coloring the text representation according to the color space, and presenting the colored text representation in association with a video-segment corresponding to the audio-segment.

According to a third aspect, a computer program product for presenting color coded text generated from an audio track of a video, the color coding denoting respective speakers, comprises: a non-transitory memory storing thereon code for execution by at least one hardware process, the code including instructions for: receiving the audio track of the video divided into a plurality of audio-segments each representing speech spoken by a respective speaker of a plurality of speakers, for each audio-segment of the plurality of audio-segments: receiving a text representation of the audio-segment, extracting a feature vector from the audio-segment, mapping the feature vector to a color space, coloring the text representation according to the color space, and presenting the colored text representation in association with a video-segment corresponding to the audio-segment.

In a further implementation of the first, second, and third aspect, feature vectors of different audio-segments of a same speaker are reduced to different shades of a same color category.

In a further implementation of the first, second, and third aspect, feature vectors of different audio-segments of different speakers are each reduced to the color space of different color categories.

In a further implementation of the first, second, and third aspect, the feature vector is generated by a speaker verification system selected from the group consisting of: i-vector, x-vector, d-vector.

In a further implementation of the first, second, and third aspect, mapping to feature vector to the color space comprises reducing a dimension of the feature vector to a dimension of the color space using a dimension reduction process.

In a further implementation of the first, second, and third aspect, the reducing the dimension is performed by mapping function that maps a plurality of feature vectors of each respective speaker into values of a same color category that have a statistically significant distance from values of another color category of another speaker.

In a further implementation of the first, second, and third aspect, the mapping function is trained using a training dataset that includes different speakers and corresponding feature vectors.

In a further implementation of the first, second, and third aspect, the mapping function is selected from the group consisting of: principal component analysis (PCA), Sammon mapping, t-SNE, and neural network.

In a further implementation of the first, second, and third aspect, the training dataset comprises a plurality of feature vectors computed for a plurality of audio-segments for a plurality of videos and a respective color category of a plurality of color categories designated for each of the plurality of speakers of the plurality of videos, wherein the mapping function is trained for maximizing a perceived color difference between the plurality of speakers.

In a further implementation of the first, second, and third aspect, the training dataset comprises a plurality of feature vectors computed for the plurality of audio-segments of the plurality of speakers extracted for the entire video, wherein the mapping function is trained for maximizing a perceived color difference between the plurality of speakers.

In a further implementation of the first, second, and third aspect, the video is further divided into a plurality of scenes, wherein the training dataset comprises a plurality of feature vectors computed for the plurality of audio-segments of the plurality of speakers extracted for each of the plurality of scenes, wherein the mapping function is trained for maximizing perceived color difference between the plurality of speakers.

In a further implementation of the first, second, and third aspect, mapping the feature vector to the color space is computed based on a principal component analysis (PCA) process by: calculating a covariance matrix for the feature vector, selecting a number of eigenvectors with maximum eigenvalues, wherein the number of eigenvectors corresponds to a number of dimensions of the color space, wherein a projection of the respective feature vector along the respective eigenvalues is mapped to the color space.

In a further implementation of the first, second, and third aspect, the text representation of the audio-segment is automatically computed by an automated speech recognition (ASR) process.

In a further implementation of the first, second, and third aspect, the audio track is automatically divided into the plurality of audio-segments by a speaker diarization process.

In a further implementation of the first, second, and third aspect, further comprising detecting an attribute of speech for each respective audio-segment, mapping the attribute of speech to instructions for adjusting characteristics of the font of the text, and wherein the colored text is presented according to the adjusted characteristics of the font of the colored text.

In a further implementation of the first, second, and third aspect, further comprising detecting an attribute of speech for each respective audio-segment, mapping the attribute of speech to instructions for adjusting characteristics of the background color of the text, and wherein the colored text is presented according to the adjusted characteristics of the background of the colored text.

In a further implementation of the first, second, and third aspect, the attributes of speech are selected from the group consisting of: speaking style, whisper, shout, calm, emotions, angry, excited, and sad.

In a further implementation of the first, second, and third aspect, further comprising: receiving a respective attribute of each speaker, wherein the mapping the feature vector to a color space is according to the respective attribute of the speaker. Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to sub-titles and, more specifically, but not exclusively, to systems and methods for automated linking of sub-titles to speakers.

An aspect of some embodiments of the present invention relates to systems, methods, an apparatus, and/or code instructions (i.e., stored in a memory and executable by one or more hardware processors) for presenting color coded text generated from an audio track of a video, where the color coding denotes respective speakers. For example, text from one speaker is colored blue, text from a second speaker is colored green, and text from a third speaker is colored red. Text of the same speaker is presented within various shades defined by the color. For example, for the first speaker, text may be colored light blue, sky blue, navy, and dark blue, where all shades fall within the color category blue. An audio track of the video is divided into multiple audio-segments. Each audio-segment represents speech spoken by a respective speaker. The following is performed for each audio-segment: A text representation of the audio-segment is received. A feature vector is extracted from the audio-segment. The feature vector is mapped to a color space. The text representation is colored according to the mapping in the color space. The colored text representation is presented in association with the respective video-segment corresponding to the audio-segment, for example, as subtitles.

It is noted that the text may be colored for content with both audio and visual components (e.g., video, movie, slide show), and/or for audio only content (e.g., radio, still image with audio track, music file, and audio file).

As used herein, the term color may sometimes be interchanged with the term color category. The term color may be defined, for example, based on human visual perception, and/or based on ranges of light wavelength and/or frequency. For example, red, orange, yellow, green, blue, and purple. The term shade (of color) may refer to variations within the same color category, for example, based on human visual perception, and/or based on sub-ranges of light wavelength and/or frequency that fall within the range of light wavelength and/or frequency of the color category. For example, a human may classify the shades light blue, sky blue, navy, and dark blue, all under the color blue. The term shade may sometimes be interchanged with the term hue.

At least some implementations of the systems, methods, apparatus, and/or code instructions described herein address the technical problem of identifying speakers in subtitles generated from an audio portion of content such as videos. Subtitles are useful, for example, for hearing impaired people who cannot (properly) hear the audio component of content (e.g., video). Even when subtitles are present, the hearing impaired are unable to determine which speaker is associated with which part of the subtitles. The dialog may be difficult to understand without knowing who said what. The hearing impaired may sometimes determine who is speaking based on lip movement, but such method is unreliable when the lips of the speaker cannot be seen. The mapping of feature vectors extracted from audio into the color space enables viewers to easily differentiate between the different speakers based on the coloring of the text transcribed from the audio.

At least some implementations of the systems, methods, apparatus, and/or code instructions described herein improve the technical field of automatic subtitle generation, by increasing the accuracy of automatically mapping subtitles to speakers.

The solution to the technical problem, and/or the improvement to the field of automatic subtitle generation, is at least implemented by the process of mapping a feature vector of features extracted from audio to a color space with a reduced dimension in comparison to the feature vector.

The mapping is selected such that feature vectors of each respective speaker are mapped to a range of color values within the color space of a common color type. The mapping of feature vectors into different shades of the same color type accommodates errors that would otherwise occur in attempting to map feature vectors directly to speakers. For example, two feature vectors which have a certain statistical distance between them may represent the same speakers (e.g., distance arising for example, from different emotions expressed in the speech, by the microphone placed at different locations, and/or due to differences in background noise), or may represent two different speakers. Mapping into the color space enables distinguishing whether one or two different speakers are speaking, by visually seeing whether the transcribed text is colored with different shades of the same color, or whether the transcribed text is colored with different shades of different colors. Rather than explicitly mapping feature vectors to speakers, mapping feature vectors to the color space inherently maps to speakers. The mapping into a range of shades of the same color type corresponding to the same speaker provides room for variability of feature vectors while still accurately mapping the different feature vectors to the same speaker via the different shades of the same color type. Feature vectors extracted from audio spoken by the same speaker, which vary (e.g., due to different emotions expressed in the speech, due to the microphone being placed at different locations, and/or due to differences in background noise) are accurately mapped to the same speaker via mapping into different shades of the same color type that correspond to the same speaker. For example, when feature vectors of a certain speaker are mapped to the color blue, variations of the values of the feature vector may result in a mapping to different shades of blue (e.g., light blue, sky blue, dark blue, navy), such that the human reading the color text perceives the different shades under the same color blue, indicating that the colored text, even when presented in different shades of the same color, are all associated with the same speaker.

At least some implementations of the systems, methods, apparatus, and/or code instructions described herein provide improvements over other standard processes for generating subtitles. For example:

Manual transcription of subtitles may add a text label of which speaker is speaking. However, manual transcription is time consuming and labor intensive, and therefore may be inaccessible for example, for home made movies, for small production companies. Manual transcription may not be possible when videos are presented in near real time (e.g., live broadcast which may be delayed by a time interval). In contrast, at least some implementations of the systems, methods, apparatus, and/or code instructions described provide a fully automatic solution.

Automatic speech recognition systems (ASR) may automatically transcribe audio speech to text, but are unable to map the text to the speaker of the audio. In contrast, at least some implementations of the systems, methods, apparatus, and/or code instructions described accurately label text according to each speaker based on color, as described herein.

Automated methods that attempt to map speakers to text transcribed from audio are inaccurate. Inaccuracies arise for several reasons. First, errors may arise in dividing the audio portion according to speakers. For example, a portion of audio spoken by one speaker may be incorrectly divided into two portions which are labeled as being spoken by two different speakers. In another example, a portion of audio that includes speech spoken by two different speakers incorrectly remains undivided and labeled with a single speaker rather than the two speakers. In contrast, at least some implementations of the systems, methods, apparatus, and/or code instructions described increase accuracy of labeling text according to speaker based on color coding, as described herein.

It is noted that the systems, methods, apparatus, and/or code instructions described herein do not simply perform automation of a manual procedure. No manual equivalent of the process described herein has been previously described. The manual process of labeling transcribed text according to speaker (e.g., speaker1, speaker2, and the like) is different than the automated process, for example, of mapping the text from the speaker to different shades of the same color.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
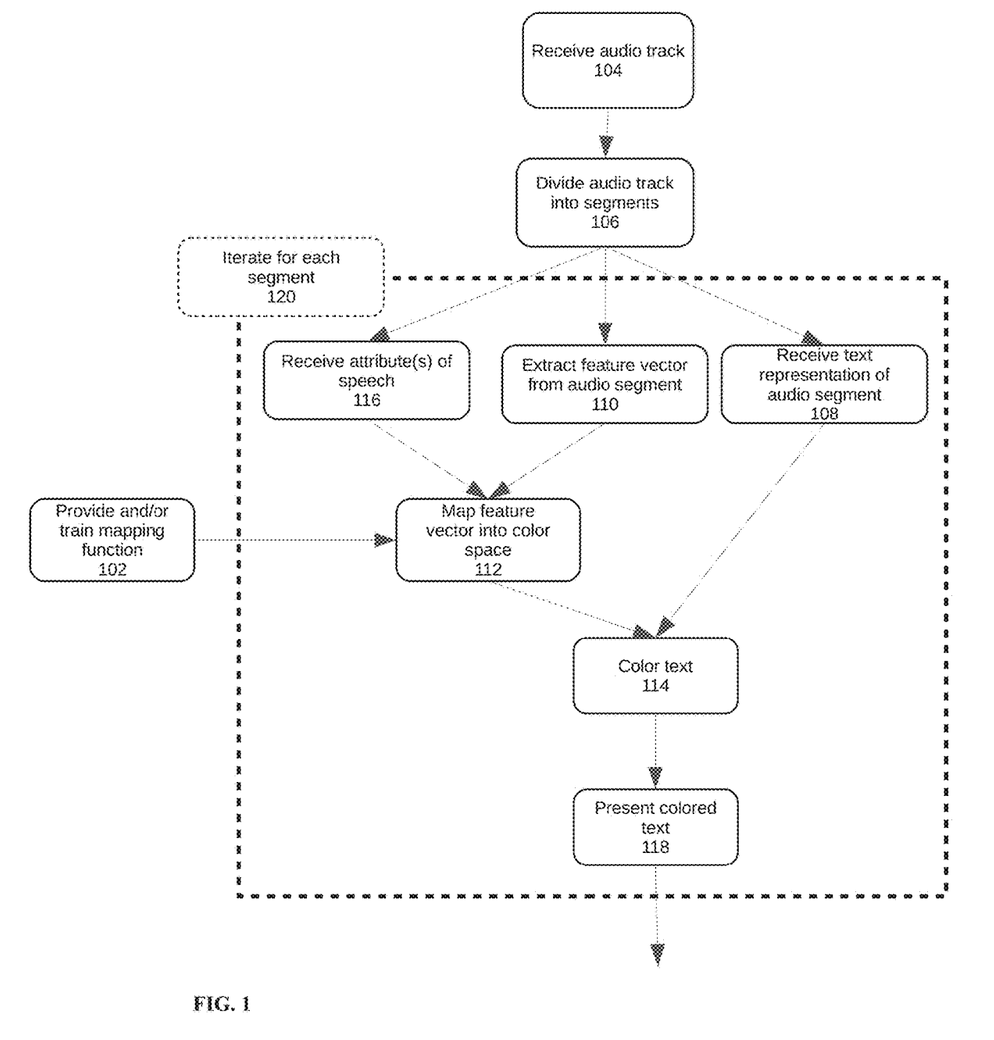
FIG. 1 is a flowchart of a method for presenting color coded text generated from an audio track of a video, where the color coding denotes respective speakers, in accordance with some embodiments of the present invention.
Figure 2:
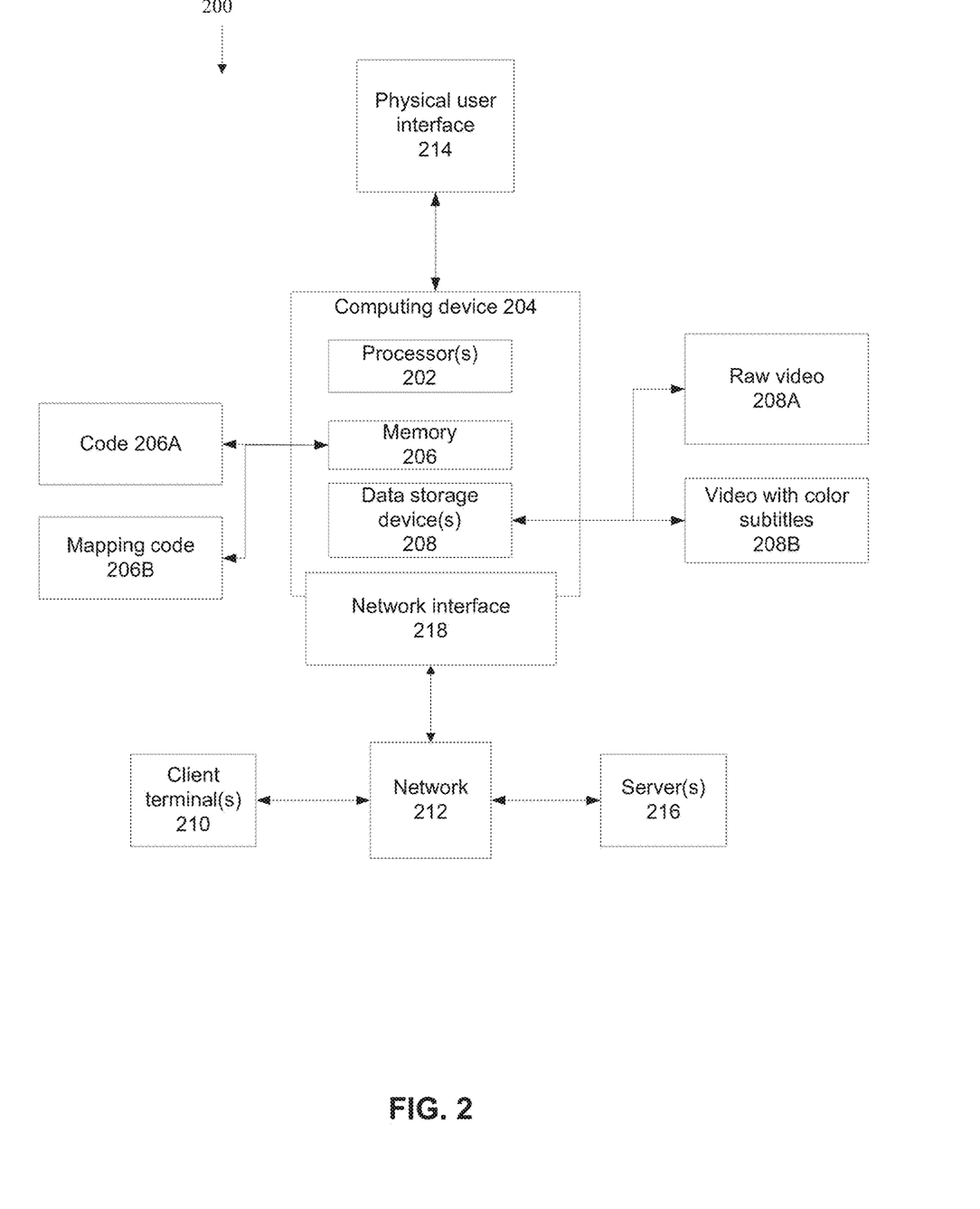
FIG. 2 is a block diagram of components of a system for presenting color coded text generated from an audio track of a video, where the color coding denotes respective speakers, in accordance with some embodiments of the present invention.

Reference is now made to FIG. 1, which is a flowchart of a method for presenting color coded text generated from an audio track of a video, where the color coding denotes respective speakers, in accordance with some embodiments of the present invention. Reference is also made to FIG. 2, which is a block diagram of components of a system 200 for presenting color coded text generated from an audio track of a video, where the color coding denotes respective speakers, in accordance with some embodiments of the present invention. System 200 may implement the acts of the method described with reference to FIG. 1, by processor(s) 202 of a computing device 204 executing code instructions (e.g., code 206A) stored in a memory 206 (also referred to as a program store).

Referring now back to FIG. 1, at 102, mapping function is provided and/or trained. The mapping function maps a certain feature vector to a color space, for example, to a value within a multi-dimensional space that denotes available colors, for example, a three dimensional space that defines a red-green-blue (RGB) color space, and/or hue-saturation-value (HSV) color space.

As used herein, the mapping function may be stored as code instructions on a memory and implemented by at least one hardware processor executing the code instructions, and/or the mapping function may be implemented in hardware and/or firmware.

The mapping function reduces a dimension of the feature vector to a dimension of the color space. The dimension of the feature vector may be very large in comparison to the dimension of the color space, for example, the dimension of the feature vector may be 256, or 1024, or other values, and the dimension of the color space may be 3 or other values. The mapping function may be implemented according to a dimension reduction process.

The mapping function may be based on linear processes, for example, principal component analysis (PCA). Alternatively or additionally, the mapping function may be based on non-linear processes, for example, Sammon mapping, and t-SNE. Alternatively or additionally, the mapping function may be based on other processes, for example, neural network(s).

The mapping function may be trained using a training dataset for maximizing a perceived color difference between different speakers. The perceived color distance may be defined, for example, as a distance between two different colors within the color space that are distinguishable as different colors by a human with normal visual capabilities (i.e., may exclude color blind individuals. In other implementations, the color differences may be selected for color blind individuals).

The mapping function is trained using a training dataset that includes different speakers and corresponding feature vectors. The feature vectors of the training dataset are computed, for example, as described herein.

The training may be performed off line, and/or to maximize differences over a whole video, and/or to maximize difference over a scene.

The offline training may be performed using a training dataset of multiple feature vectors computed for audio-segments of multiple videos each having different speakers. The offline training may train the mapping function to map feature vectors of speakers that are not in the training dataset, which may enable online (e.g., real-time) processing, for example, of live video feeds.

The training to maximize color difference over a certain video may be performed using a training dataset of feature vectors computed for the audio-segments of the speakers extracted for the entire video. Features vectors for the different speakers may be extracted from the entire video (i.e. audio portion), or portions thereof, and used to maximize the perceived color difference between the speakers of the video. The whole video may be pre-processed prior to the coloring of the text. The same coloring may be maintained for the same speaker throughout the whole video. Such implementation may be used, for example, when the number of speakers is not large enough such that each speaker may be assigned a unique color, and where a user is able to accurately distinguish between any two colors of different speakers.

The training to maximize color difference over a scene may be performed using a training dataset created from scenes of the video. The training dataset includes feature vectors computed for the audio-segments of the speakers extracted for each of the scenes. The video is divided into scenes, for example, automatically by code and/or manually by a user. The perceived color difference between speakers in the scene is maximized Maximizing color difference per scene may make it simpler for viewers to tell the difference between speakers in the scene, but different colors for the same speaker may result over different scenes. Such method may be implemented, for example, when the number of speakers is larger, and processing the entire video to assign one color per speaker may result in two speakers having similar colors that are difficult to distinguish. The per-scene maximization helps the viewer distinguish between the speakers, by reducing the number of colors used in each scene so that any two colors of respective speakers are easily distinguished.

Optionally, one or more attributes are received for one or more speakers. Attributes of speakers may be obtained, for example, by code that analyzes the visual and/or audio component, from metadata associated with the video and/or audio component, and/or manually entered by a user. Exemplary attributes of speakers include: gender, good character, bad character, occupation, rank (e.g., king, commander), and wealth (e.g., rich or poor). The mapping function may be trained according to the respective attribute of the speaker. For example, the color for each speaker may be selected according to the attribute(s) of the respective speaker. For example, an evil character is assigned the color red (i.e., text corresponding to speech by the character is colored red), and a good character is assigned the color blue. In another example, a wealthy character is assigned the color yellow.

At 104, the audio track is received. The audio track may be of a video that includes a visual component. The audio track may be digital and/or analogue. Analogue audio may be digitized.

Optionally, the audio track is single channel. Alternatively, the audio track is multi-channel (e.g., stereo, surround sound) with two or more speakers for each channel. The mapping function described herein accurately assigns different colors to text generated from speech of different speakers arising from the same audio channel.

The mapping function may have been trained on a training dataset that includes the received audio track. Alternatively or additionally, the mapping function may have been trained on a training dataset that includes speakers of the received audio track, which are speaking in different audio tracks. For example, the mapping function is trained on episodes of a television series that do not include the current episode being processed. Alternatively or additionally, the mapping function may have been trained on a training dataset that includes speakers of audio tracks that are not represented in the received audio track. For example, the mapping function is trained on episodes of a certain television series, while the received audio track is of an episode of a movie and/or a different television series. In such implementation, there is no need for pre-training the mapping function for a specific set of speakers. The trained mapping function may perform the mapping for speakers on which the mapping function has not been previously trained.

At 106, the audio track is divided into multiple audio-segments. Each audio segment represents (i.e., depicts) speech spoken by a respective speaker. There are multiple different speakers speaking in the audio track.

The audio track may be automatically divided into the audio-segments, for example, by a speaker diarization process.

Features described with reference to acts 108-118 are performed for each audio-segment, sequentially and/or in parallel.

At 108, a text representation of the audio-segment is received. The text representation may be a transcription of the audio speech, for example, automatically computed by an automated speech recognition (ASR) process. Text may be in English, or other languages.

At 110, a feature vector is extracted from the audio-segment. The feature vectors may be designed for speaker verification. Exemplary feature vectors include: i-vector (e.g., as described with reference to Dehak, N., Dehak, R., Kenny, P., Brummer, N., Ouellet, P and Dumouchel, P., *Support Vector Machines versus Fast Scoring in the Low-Dimensional Total Variability Space for Speaker Verification* In *Proc Interspeech* 2009, Brighton, UK, September 2009), x-vector (e.g., as described with reference to D. Snyder, D. Garcia-Romero, G. Sell, D. Povey, and S. Khudanpur, "*X-Vectors: Robust embeddings for speaker recognition*", in *Proc. ICASSP,* 2018), and d-vector.

At 112, the feature vector is mapped to a color space by the mapping function.

The mapping function may perform the mapping of the feature vector to the color space by reducing the dimension of the feature vector according to the dimension defined by the color space.

Exemplary color spaces include: red-green-blue (RGB) and/or HSV. The color spaces may be defined, for example, according to the display hardware that presents the color coded text. For example, a television, a movie screen, a display of a desktop computer, a display of a mobile device, wearable glasses computer, and a display of a watch computer.

Feature vector of different audio-segments of the same speaker are reduced to different shades of the same color category. Different feature vectors of the same speaker are mapped to values (e.g., coordinates, locations) within a region of the color space that defines a single color. Variation of values within the region denote different shades of the same color.

Feature vectors of different audio-segments of different speakers are each reduced to the color space of different color categories. Different features vectors of different speakers are mapped to different regions within the color space, where each respective region denotes a different color. Variations of values within each respective region denote different shades of the respective color denoted by the respective region.

The mapping may be performed to maximize the perceived color differences between different speakers. For example, the mapping function may maps feature vectors of each respective speaker into values of a same color category that have a statistically significant distance from values of another color category of another speaker. The statistical significance may be determined, for example, based on visual capabilities of a target viewer, which may have normal vision and/or be color blind. The statistical significance denotes the ability of the viewer to differentiate between different shades as belonging to different colors, or to the same color. In another example, the feature vector is mapped to the color space based on a PCA process as follows: a covariance matrix is calculated for the feature vector(s). A number of eigenvectors with maximum eigenvalues are selected. The number of eigenvectors corresponds to the number of dimensions of the color space. A projection of the respective feature vector along the respective eigenvalues is mapped to the color space.

Optionally, the mapping of the feature vector into the color space is performed according to the color assigned to the respective speaker according to the attribute(s) of the speaker, as described herein.

Optionally, the color space is expanded to include candidate adjustment(s) of fonts, for example, size, weight, slant, and/or special effects, for example, as additional dimensions of the color space. The mapping function may map the feature vector into the expanded color space, such that the text of the audio-segment is mapped to a certain shade of a certain color and to a certain font adjustment. The mapping function may be trained for mapping into the expanded color space using an expanded training dataset that includes font adjustments.

At 114, the text representation is colored according to the value in the color space. The pixels of the text may be colored according to the pixel intensity values denoted by the mapping into the color space. For example, when the color space is defined using three dimensions, where each dimension corresponds to one of red, green and blue, values along each dimension represent pixel intensity values for pixels denoting the respective colors. Value of the color space may denote normalized pixel intensity values, and/or absolute pixel intensity values.

At 116, one or more attributes of the speech of the audio-segment are received and/or detected. Attributes may be obtained, for example, by code that analyzes the video and/or audio component, from metadata associated with the video and/or audio component, and/or manually entered parameters.

The attributes of speech may denote the manner of speech, for example, speaking style, whisper, shouting, fast speech, and slow speech. The attribute of speech may reflect the emotions of the speaker, for example, calm, anger, excitement, sadness, and coldness.

Optionally, the attribute of speech is mapped to instructions for adjusting characteristics of the font of the text.

Alternatively or additionally, the attribute of speech is mapped to instructions for adjusting characteristics of the background color of the text. The mapping may be performed, for example, based on a set of rules, which may be manually and/or automatically defined. The font of the colored text and/or background of the colored text is adjusted according to the instructions.

For example, fonts depicting a whisper are presented in a smaller size. Fonts depicting shouting are depicted in all capital letters and/or a larger size. Background of fonts depicting anger may be colored red. Background of fonts depicting calmness may be colored light blue. Fonts depicting coldness may be processes to depict icicles dripping from the letters.

Other exemplary adjustments of fonts include: size, weight, slant, special effects, and combinations of the aforementioned.

Optionally, the candidate adjustment of the font is implemented as an extension of the color space. In such implementation, the feature vector is an extended feature vector that includes the attribute of speech, and the mapping function maps the extended feature vector into the extended color space.

At 118, the colored text representation is presented. The colored text may be presented in association with the video-segment corresponding to the audio-segment, for example, as a subtitle, and/or speech balloon.

The colored text may be presented with adjusted characteristics of the font, according to the font based on the attribute(s). The background of the colored text may be presented according to the attribute(s).

At 120, features described with reference to acts 108-118 are implemented for each audio-segment. Audio-segments may be processed sequentially (e.g., according to original order) and/or processed in parallel.

Computing device 204 may be implemented as, for example one or more and/or combination of: a group of connected devices, a client terminal, a server, a virtual server, a computing cloud, a virtual machine, a video editing workstation, a smart television, a video storage server, a desktop computer, a thin client, a network node, a network server, and/or a mobile device (e.g., a Smartphone, a Tablet computer, a laptop computer, a wearable computer, glasses computer, and a watch computer).

Different architectures of system 200 may be implemented, for example:

Computing device 204 may be implemented as one or more servers (e.g., network server, web server, a computing cloud, a virtual server, a network node, a video storage server, a video editing station) that provides services to multiple client terminals 210 over a network 212, for example, software as a service (SaaS), broadcast programming, pay per view of videos, subscription to television channels, and/or other remote services.

Communication between client terminal(s) 210 and computing device 204 over network 212 may be implemented, for example, via broadcast, via a television network, via a pay per view application, via a television channel subscription service, via an application programming interface (API), software development kit (SDK), functions and/or libraries and/or add-ons added to existing applications executing on client terminal(s), an application for download and execution on client terminal 210 that communicates with computing device 204, function and/or interface calls to code executed by computing device 204, a remote access section executing on a web site hosted by computing device 204 accessed via a web browser executing on client terminal(s) 210, client terminal(s) 210 may be implemented as thin clients and/or slaves and/or users of computing device 204, for example, a television that receives broadcasts of television channels.

For example, client terminals 210 may be implemented as televisions, smart televisions, and/or end terminals that receive videos with color coded subtitles from server(s) 216 and/or from computing device 204, for example, by broadcast, by pay per view, by streaming over a network, and/or by subscription to television channels. For example, a broadcast service that provides subscribers with videos with color subtitles.

In another example, client terminals 210 provide the raw videos to computing device, which provides the service of computing color subtitles for the raw videos, and provides the videos with color subtitles back to client terminal 210. For example, computing device 204 provides a service for generation of color subtitles to customized videos, for example, home videos, personal recorded videos, and/or movies produced by production companies.

Computing device 204 may be implemented as a stand-alone device (e.g., client terminal, smartphone, smart television, computing cloud, virtual machine, kiosk) that includes locally stored code that implement one or more of the acts described with reference to FIG. 2. For example, computing device 204 may be implemented as a smart television that automatically computes color coded subtitles for home made videos.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202. Memory 206 may store mapping function 206B that maps the feature vector to the color space, as described herein.

Computing device 204 may include data storage device(s) 208 for storing data, for example, raw videos 208A (i.e., without color coded subtitles) used for creating videos with color subtitles 208B (as described herein). Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a broadcast network, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, an antenna, a broadcast reception device, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 include and/or are in communication with one or more physical user interfaces 214 that include a mechanism for user interaction, for example, to enter data (e.g., select a video for generation of color subtitles thereof) and/or to view data (e.g., view the video with color subtitles).

Exemplary physical user interfaces 214 include, for example, one or more of, a touchscreen, a display, gesture activation devices, a keyboard, a mouse, and voice activated software using speakers and microphone.

Computing device 204 may communicate with one or more of the following over network 212:

Client terminal(s) 210, for example, used as endpoints where the video with subtitle is viewed by end users, where computing device 204 acts as a central server storing the videos with color subtitles and distributes the videos with color subtitles to the endpoints, for example, via streaming, download, and/or broadcast. In another example, client terminal 210 provides the raw video to computing device 204, and receives back the video with color subtitles.

Server(s) 216, for example, which may store raw videos (which are provided to computing device 204 for automatic generation of colored subtitles thereof), and/or stores videos with color subtitles (e.g., a streaming service).

Client terminal(s) 210 and/or server(s) 216 may be implemented as, for example, as a desktop computer, a server, a television, a smart television, a virtual server, a network server, a web server, a virtual machine, a thin client, and a mobile device.

Figure 3:
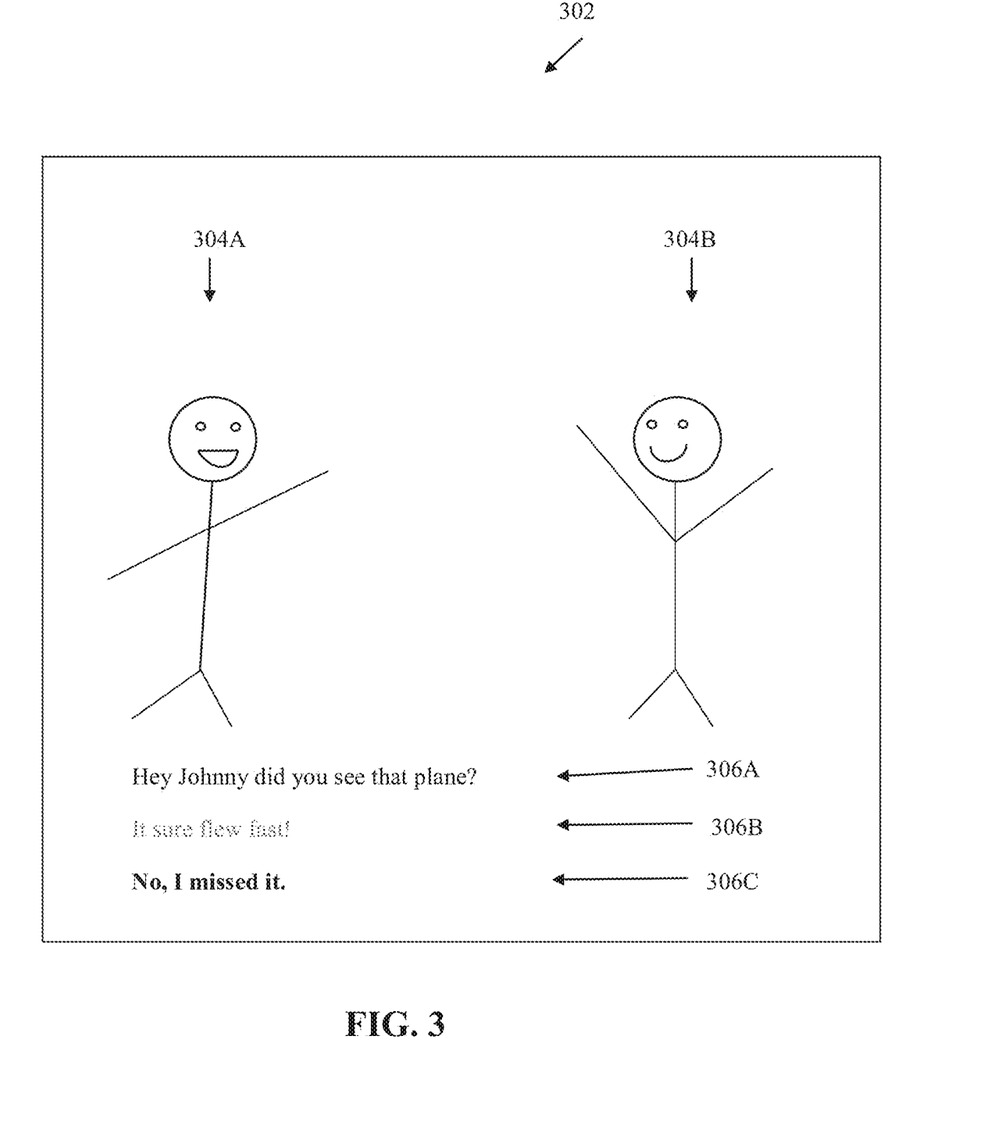
FIG. 3 is a schematic depicting an example of a screen presenting an image of a video with color coded text, in accordance with some embodiments of the present invention.

Reference is now made to FIG. 3, which is a schematic depicting an example of a screen 302 presenting an image of a video with color coded text, in accordance with some embodiments of the present invention. Screen 302 presents two characters 304A and 304B. Text derived from the audio-segment associated with the presented image is colored as described herein, where each character 304A and 304B is associated with a certain color category. Text 306A (i.e., "Hey Johnny did you see that plane?") and text 306B (i.e., "It sure flew fast!" are associated with the same color category of character 304A. Each text 306A and 306B is colored with a different shade of the same color category of character 304, for example, due to differences in the extracted feature vector arising from background noise (e.g., sound of the plane, cars, and the like). For example, text 306A is colored dark blue, and text 306B is colored light blue. Text 306C (i.e., "No, I missed it.") is colored with a different color category associated with the second character 304B. The second color category may be selected for maximal visual differentiation from the first color category. For example, text 306C is colored red.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant mapping functions will be developed and the scope of the term mapping function is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of presenting color coded text generated from an audio track of a video, the color coding denoting respective speakers, comprising:
   receiving the audio track of the video divided into a plurality of audio-segments each representing speech spoken by a respective speaker of a plurality of speakers;
   for each audio-segment of the plurality of audio-segments:
     receiving a text representation of the audio-segment;
     extracting a feature vector from the audio-segment;
     mapping the feature vector to a color space;
     coloring the text representation according to the color space; and
     presenting the colored text representation in association with a video-segment corresponding to the audio-segment;
   wherein mapping to feature vector to the color space comprises reducing a dimension of the feature vector to a dimension of the color space using a dimension reduction process;
   wherein the reducing the dimension is performed by mapping function that maps a plurality of feature vectors of each respective speaker into values of a same color category that have a statistically significant distance from values of another color category of another speaker.

2. The method of claim 1, wherein feature vectors of different audio-segments of a same speaker are reduced to different shades of a same color category.

3. The method of claim 1, wherein feature vectors of different audio-segments of different speakers are each reduced to the color space of different color categories.

4. The method of claim 1, wherein the feature vector is generated by a speaker verification system selected from the group consisting of: i-vector, x-vector, d-vector.

5. The method of claim 1, wherein the mapping function is trained using a training dataset that includes different speakers and corresponding feature vectors.

6. The method of claim 1, wherein the text representation of the audio-segment is automatically computed by an automated speech recognition (ASR) process.

7. The method of claim 1, wherein the audio track is automatically divided into the plurality of audio-segments by a speaker diarization process.

8. The method of claim 1, further comprising detecting an attribute of speech for each respective audio-segment, mapping the attribute of speech to instructions for adjusting characteristics of the font of the text, and wherein the colored text is presented according to the adjusted characteristics of the font of the colored text.

9. The method of claim 5, wherein the mapping function is selected from the group consisting of: principal component analysis (PCA), Sammon mapping, t-SNE, and neural network.

10. The method of claim 5, wherein the training dataset comprises a plurality of feature vectors computed for a plurality of audio-segments for a plurality of videos and a respective color category of a plurality of color categories designated for each of the plurality of speakers of the plurality of videos, wherein the mapping function is trained for maximizing a perceived color difference between the plurality of speakers.

11. The method of claim 5, wherein the training dataset comprises a plurality of feature vectors computed for the plurality of audio-segments of the plurality of speakers extracted for the entire video, wherein the mapping function is trained for maximizing a perceived color difference between the plurality of speakers.

12. The method of claim 5, wherein the video is further divided into a plurality of scenes, wherein the training dataset comprises a plurality of feature vectors computed for the plurality of audio-segments of the plurality of speakers extracted for each of the plurality of scenes, wherein the mapping function is trained for maximizing perceived color difference between the plurality of speakers.

13. A computer implemented method of presenting color coded text generated from an audio track of a video, the color coding denoting respective speakers, comprising:
receiving the audio track of the video divided into a plurality of audio-segments each representing speech spoken by a respective speaker of a plurality of speakers;
for each audio-segment of the plurality of audio-segments:
receiving a text representation of the audio-segment;
extracting a feature vector from the audio-segment;
mapping the feature vector to a color space;
coloring the text representation according to the color space;
presenting the colored text representation in association with a video-segment corresponding to the audio-segment; and
detecting an attribute of speech for each respective audio-segment, mapping the attribute of speech to instructions for adjusting characteristics of the background color of the text, and wherein the colored text is presented according to the adjusted characteristics of the background of the colored text.

14. The method of claim 13, wherein the attributes of speech are selected from the group consisting of: speaking style, whisper, shout, calm, emotions, angry, excited, and sad.

15. The method of claim 13, further comprising: receiving a respective attribute of each speaker, wherein the mapping the feature vector to a color space is according to the respective attribute of the speaker.

16. A computer implemented method of presenting color coded text generated from an audio track of a video, the color coding denoting respective speakers, comprising:
receiving the audio track of the video divided into a plurality of audio-segments each representing speech spoken by a respective speaker of a plurality of speakers;
for each audio-segment of the plurality of audio-segments:
receiving a text representation of the audio-segment;
extracting a feature vector from the audio-segment;
mapping the feature vector to a color space;
coloring the text representation according to the color space; and
presenting the colored text representation in association with a video-segment corresponding to the audio-segment;
wherein mapping the feature vector to the color space is computed based on a principal component analysis (PCA) process by: calculating a covariance matrix for the feature vector, selecting a number of eigenvectors with maximum eigenvalues, wherein the number of eigenvectors corresponds to a number of dimensions of the color space, wherein a projection of the respective feature vector along the respective eigenvalues is mapped to the color space.

17. A system for presenting color coded text generated from an audio track of a video, the color coding denoting respective speakers, comprising:
at least one hardware processor executing a code for:
receiving the audio track of the video divided into a plurality of audio-segments each representing speech spoken by a respective speaker of a plurality of speakers;
for each audio-segment of the plurality of audio-segments:
receiving a text representation of the audio-segment;
extracting a feature vector from the audio-segment;
mapping the feature vector to a color space;
coloring the text representation according to the color space; and
presenting the colored text representation in association with a video-segment corresponding to the audio-segment;
wherein mapping to feature vector to the color space comprises reducing a dimension of the feature vector to a dimension of the color space using a dimension reduction process;
wherein the reducing the dimension is performed by mapping function that maps a plurality of feature vectors of each respective speaker into values of a same color category that have a statistically significant distance from values of another color category of another speaker.

18. A computer program product for presenting color coded text generated from an audio track of a video, the color coding denoting respective speakers, comprising:
a non-transitory memory storing thereon code for execution by at least one hardware process, the code including instructions for:
receiving the audio track of the video divided into a plurality of audio-segments each representing speech spoken by a respective speaker of a plurality of speakers;

for each audio-segment of the plurality of audio-segments:
   receiving a text representation of the audio-segment;
   extracting a feature vector from the audio-segment;
   mapping the feature vector to a color space;
   coloring the text representation according to the color space; and
   presenting the colored text representation in association with a video-segment corresponding to the audio-segment;
wherein mapping to feature vector to the color space comprises reducing a dimension of the feature vector to a dimension of the color space using a dimension reduction process;
wherein the reducing the dimension is performed by mapping function that maps a plurality of feature vectors of each respective speaker into values of a same color category that have a statistically significant distance from values of another color category of another speaker.

* * * * *